No. 839,390. PATENTED DEC. 25, 1906.
T. C. JOHNSON.
CARTRIDGE STOP FOR TUBULAR MAGAZINE GUNS.
APPLICATION FILED MAY 26, 1906.
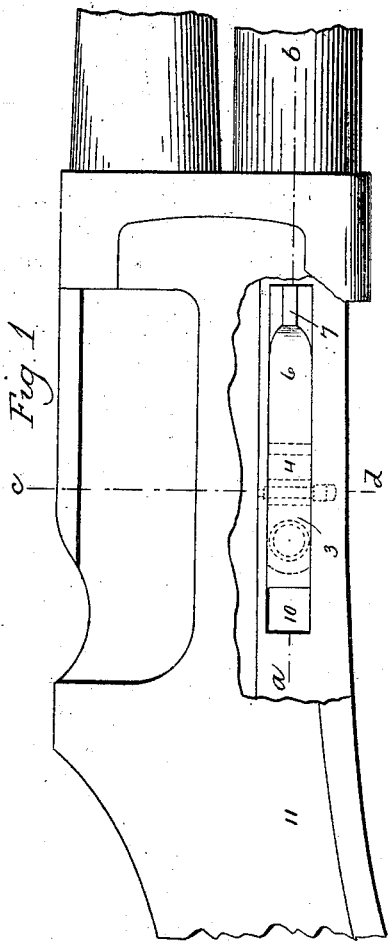
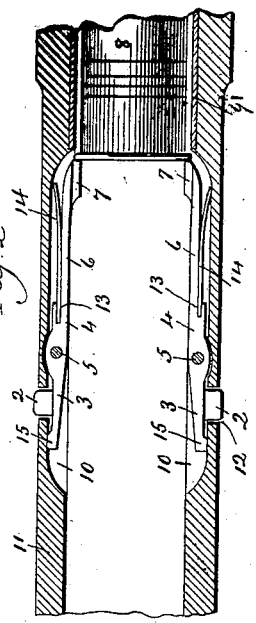
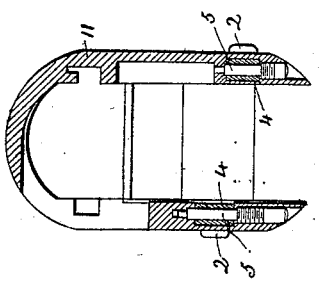

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

CARTRIDGE-STOP FOR TUBULAR-MAGAZINE GUNS.

No. 839,390.     Specification of Letters Patent.     Patented Dec. 25, 1906.

Application filed May 26, 1906. Serial No. 318,803.

*To all whom it may concern:*

Be it known that I, THOMAS C. JOHNSON, a citizen of the United States, residing at New Haven, in the county of New Haven and State of Connecticut, have invented a new and useful Improvement in Cartridge-Stops for Tubular-Magazine Guns; and I do hereby declare the following, when taken in connection with the accompanying drawings and the numerals of reference marked thereon, to be a full, clear, and exact description of the same, and which said drawings constitute part of this specification, and represent, in—

Figure 1, a broken view, in side elevation, of a gun provided with my improved cartridge-stops; Fig. 2, a broken view thereof, in horizontal section, on the line $a\,b$ of Fig. 1; Fig. 3, a view thereof in transverse section on the line $c\,d$ of Fig. 1; Fig. 4, a detached view, in side elevation, of one of the stops; Fig. 5, a plan view thereof.

My invention relates to an improvement in cartridge-stops for tubular-magazine guns, the object being to produce a simple, reliable, and convenient one-piece stop adapted to be manually operated to at any time permit any or all of the cartridges in the tubular magazine to be unloaded without operating the breech mechanism of the gun.

With these ends in view my invention consists in the construction and combination to be hereinafter described, and pointed out in the claim.

In carrying out my invention as herein shown I form an outwardly-projecting integral finger-button or fixed projection 2 upon the rear end or tail 3 of a pivotal cartridge-stop 4, having a vertical pivot-hole $4^a$, hung upon a screw-pivot 5 and extended forward to form a long stop-finger 6, the extreme forward end of which is turned inward to form a nose 7 to engage with the heads of cartridges 8, located in the tubular magazine 9. By preference and as shown I employ two of these stops, which are substantially identical in construction and located in long horizontal recesses 10, formed in the inner faces of the opposite walls of the gun frame or receiver 11. The recesses 10 are not located opposite each other, the recess in the left-hand wall in the gun-frame being located above the recess in the right-hand wall thereof, as shown in Fig. 3. This arrangement is resorted to to clear other features of the mechanism. The outer or bottom walls of these recesses are formed near their rear ends with lateral clearance openings or holes 12 for the outward passage through them of the finger-buttons 2, which project just enough beyond the outer faces of the side walls of the gun-frame to permit them to be operated by the user of the gun, who employs his thumb and forefinger for the purpose. At a point in front of its pivot 5 each stop is formed with a slot 13 for the reception of the rear end of a leaf-spring 14, which is located in the bottom of the forward end of the recess 10 of the stop. These springs exert a constant effort to swing the stops so as to keep their noses 7 in position to be engaged by the head of the rearmost cartridge in the tubular magazine. When the stops are so swung, their finger-buttons 2 will project slightly through the holes 12 in the sides of the gun frame or receiver, as before explained. To prevent the nose 7 from being swung too far inward by the spring 14, a raised stop-shoulder 15 is formed upon the outer face of the extreme rear end of the tail 3 of each of the stops 4, and therefore to the rear of their finger-buttons 2. These stop-shoulders engage with the bottom walls of the recesses 10 and prevent the cartridge-stops from being swung too far by the said springs 14. The operation of the cartridge-stops has to be very nicely adjusted, and for that reason in their manufacture the stop-shoulders 15 are left full enough to permit them to be filed down and so adjusted until they bear upon the bottom walls of the recesses 10 with the noses 7 of the stops in exactly the right position with reference to the heads of the cartridges.

The screw-pivots 5 are formed at their lower ends with externally-threaded heads $5^a$ and at their upper ends with small trunnions $5^d$, their intermediate portions passing through the pivot-holes $4^a$ in the stops 4. For the reception of the said screw-pivots 5 the side walls of the frame are formed with pivot-holes $11^a$ entering their lower edges and having their lower portions threaded for the reception of the threaded heads $5^a$ of the screw-pivots 5 and their upper ends contracted to fit the small trunnions $5^b$ thereof.

It will be understood that in the normal operation of the gun the pivotal cartridge-carrier, which is not shown, but which may be of any approved construction, coacts with the stops, so as to retire them and permit the feeding of the cartridges rearward out of the tubular magazine. When, however, it is desired to unload the magazine, the user of the arm clasps the gun frame or receiver and with his thumb and forefinger presses the finger-buttons 2 of the respective stops inward, whereby the noses at their forward ends are swung outward and disengaged from the cartridges, which are then left free to be discharged from the magazine. In this way the magazine may be unloaded quickly and quietly without disturbing the breech mechanism of the gun.

I am aware that it has been proposed to locate a cartridge-stop in the bottom of a longitudinal recess formed in the inner face of one of the side walls of the frame of a tubular-magazine firearm and to provide for its manual operation a button made independently of it and loosely mounted in a lateral bearing-hole leading out of the rear end of the said recess. I do not, therefore, broadly claim a cartridge-stop in combination with an operating-button for its manual operation, but only my particular construction.

I claim—

In a tubular-magazine firearm, the combination with a gun-frame having the inner face of its right-hand side wall formed with a longitudinal recess, and the inner face of its left-hand side wall formed with a longitudinal recess located above the recess before mentioned, and the said side walls being also formed with lateral openings leading out of the rear ends of the said recesses, and with downwardly-opening vertical pivot-holes the lower ends of which are threaded and the upper ends of which are reduced in diameter; of a tubular magazine, spring-actuated cartridge-stops located in the said recesses, formed with vertical pivot-holes and adapted at their forward ends to be engaged with the heads of cartridges in the tubular magazine; screw-pivots entering the said threaded pivot-holes in the side walls of the gun-frame, and passing upward through the pivot-holes in the stops, and formed at their lower ends with threaded heads taking into the threads of the said threaded pivot-holes; and fixed finger-buttons or projections located upon the outer faces of the rear ends of the stops and projecting outward through the said openings which are located at different elevations to correspond to the difference in elevation between the respective recesses.

In testimony whereof I have signed this specification in the presence of two subscribing witnesses.

THOMAS C. JOHNSON.

Witnesses:
DANIEL H. VEADER,
HERBERT F. BEEBE.